United States Patent
Lee et al.

(10) Patent No.: US 12,459,487 B2
(45) Date of Patent: Nov. 4, 2025

(54) PRE-CONDITIONING SYSTEM FOR BATTERY OF VEHICLE AND OPERATING METHOD THEREOF

(71) Applicants: Hyundai Motor Company, Seoul (KR); Kia Corporation, Seoul (KR)

(72) Inventors: Joong Woo Lee, Yongin-si (KR); Jin Gyu Lim, Gumi-si (KR); Seung Myun Chung, Seoul (KR); Tae Geun Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 265 days.

(21) Appl. No.: 17/984,522

(22) Filed: Nov. 10, 2022

(65) Prior Publication Data
US 2023/0159015 A1    May 25, 2023

(30) Foreign Application Priority Data
Nov. 19, 2021   (KR) .................. 10-2021-0160084

(51) Int. Cl.
*B60L 53/60* (2019.01)
*B60L 53/30* (2019.01)
(Continued)

(52) U.S. Cl.
CPC ........... *B60W 10/26* (2013.01); *B60L 53/305* (2019.02); *B60L 58/12* (2019.02); *B60L 58/27* (2019.02);
(Continued)

(58) Field of Classification Search
CPC .......... B60W 10/26; B60W 2510/246; B60W 2710/246; B60W 2756/10; B60L 53/305;
(Continued)

(56) References Cited

U.S. PATENT DOCUMENTS

| 12,117,308 B2 * | 10/2024 | Carbune ............ G01C 21/3641 |
| 2014/0042968 A1 * | 2/2014 | Hiroe ..................... B60L 53/665 |
| | | 320/109 |

(Continued)

FOREIGN PATENT DOCUMENTS

| CN | 105095611 A | * | 11/2015 |
| CN | 108312857 | * | 1/2017 |

(Continued)

*Primary Examiner* — Daniel M. Robert
(74) *Attorney, Agent, or Firm* — Morgan Lewis & Bockius LLP (57) ABSTRACT

A method of the pre-conditioning system for a battery of a vehicle includes: receiving an input of a destination of the vehicle; generating and outputting a destination route to the destination; searching for information on one or more battery charging stations located within a predetermined range on or around the destination route; determining whether each of the searched battery charging stations satisfies a preset environmental condition; adding a charging station path to a charging station selected among charging stations provided with the environmental condition to the destination route; determining whether the battery of the vehicle satisfies a preset state condition; and warming the battery at a preset time point when the preset state condition is satisfied.

14 Claims, 5 Drawing Sheets

(51) Int. Cl.
  *B60L 58/12* (2019.01)
  *B60L 58/27* (2019.01)
  *B60W 10/26* (2006.01)
  *G01C 21/26* (2006.01)
(52) U.S. Cl.
  CPC . *B60W 2510/246* (2013.01); *B60W 2710/246* (2013.01); *B60W 2756/10* (2020.02); *G01C 21/26* (2013.01)
(58) Field of Classification Search
  CPC .......... B60L 58/12; B60L 58/27; B60L 1/003; B60L 53/60; B60L 2240/545; B60L 2240/622; B60L 53/62; B60L 53/11; Y02T 10/70; Y02T 10/7072; Y02T 90/12; Y02T 90/167; B60Y 2200/91; B60Y 2200/92
  See application file for complete search history.

(56) References Cited

U.S. PATENT DOCUMENTS

| | | | | |
|---|---|---|---|---|
| 2014/0257884 | A1* | 9/2014 | Kyoung | G06Q 10/02 705/5 |
| 2015/0226572 | A1* | 8/2015 | North | B60L 53/68 701/400 |
| 2018/0189683 | A1* | 7/2018 | Newman | B60L 58/12 |
| 2018/0202825 | A1* | 7/2018 | You | G08G 1/20 |
| 2019/0271555 | A1* | 9/2019 | Sheridan | G01C 21/3644 |
| 2020/0003571 | A1* | 1/2020 | Shirakawa | G06Q 50/10 |
| 2020/0139845 | A1* | 5/2020 | Henrichs | H04L 12/40 |
| 2020/0185928 | A1* | 6/2020 | Ha | B60L 58/27 |
| 2020/0317080 | A1* | 10/2020 | Jeon | G01C 21/3469 |
| 2021/0086651 | A1* | 3/2021 | Maeda | B60L 53/66 |
| 2021/0155111 | A1* | 5/2021 | Ni | G06F 30/20 |
| 2023/0079044 | A1* | 3/2023 | Lee | H01M 10/443 701/22 |
| 2023/0159015 | A1* | 5/2023 | Lee | B60W 10/26 701/22 |

FOREIGN PATENT DOCUMENTS

| | | | |
|---|---|---|---|
| JP | 2016220310 A | * | 12/2016 |
| JP | 2020013726 | * | 7/2018 |
| KR | 10-1558674 B | | 10/2015 |
| KR | 10-2057146 B1 | * | 12/2019 |

* cited by examiner

PRE-CONDITIONING SYSTEM FOR BATTERY OF VEHICLE AND OPERATING METHOD THEREOF

CROSS REFERENCE TO RELATED APPLICATION

The present application claims priority to Korean Patent Application No. 10-2021-0160084, filed Nov. 19, 2021, the entire contents of which is incorporated herein for all purposes by this reference.

BACKGROUND OF THE PRESENT DISCLOSURE

Field of the Present Disclosure

The present disclosure relates to a pre-conditioning system for improving charging performance of a battery, and more particularly, to a pre-conditioning system for a battery of an eco-friendly vehicle.

Description of Related Art

Driven by motors, eco-friendly vehicles, such as electric vehicles, plug-in hybrid electric vehicles, and the like, have been increasingly supplied in recent years. A drive motor of an eco-friendly vehicle is driven by electrical energy stored in a high-voltage battery mounted on the vehicle. The battery needs to be periodically charged to restore power consumed according to the operation of the vehicle.

Accordingly, it is essential to improve charging performance, such as shortening the charging time of batteries in the eco-friendly vehicles. In general, lithium-ion batteries mounted in vehicles have temperature-sensitive charging and discharging characteristics, so a charging current map is constructed in consideration of battery performance and durability for each temperature condition. Accordingly, charging performance varies by conditions of battery temperature and voltage based on the charging current map. For example, the battery is charged with a low current at a low temperature, so that the charging time becomes relatively longer than when the battery is not under the low-temperature condition.

Accordingly, there is a demand for a battery charging control strategy capable of shortening the charging time of the battery and improving the charging performance even under low-temperature conditions.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery pre-conditioning system configured for improving charging performance of a battery under low-temperature conditions.

Objectives of the present disclosure are not limited to the objective mentioned above, and other objectives not mentioned may be clearly understood by those of ordinary skill in the art (hereinafter referred to as "persons of ordinary skill") from the description below.

To achieve the objective of the present disclosure as described above and perform the characteristic functions of the present disclosure to be described later, there may be provided a pre-conditioning system for a battery and an operating method thereof, and the features of the present disclosure are as follows.

According to various exemplary embodiments of the present disclosure, the method may include: receiving an input of a destination of the vehicle; generating and outputting a destination route to the destination; searching for information on one or more battery charging stations located within a predetermined range on or around the destination route; determining whether each of the searched battery charging stations satisfies a preset environmental condition; adding to the destination route a charging station path, wherein the charging station is a path to a battery charging station selected among the battery charging stations satisfying the environmental condition; determining whether the battery of the vehicle satisfies a preset state condition; and warming the battery at a preset time point when the preset state condition is satisfied.

According to various exemplary embodiments of the present disclosure, the system for a battery may include: an input unit configured to receive input information of a user of the vehicle and to receive charging infrastructure information including charging station location information of the battery transmitted from an outside of the vehicle; a battery management system configured to detect state information of the battery of the vehicle and drive a battery heater for heating the battery; and a controller configured to communicate with the input unit and the battery management system and generate one or more commands based on information received from the input unit and the battery management system, wherein the controller is configured to: based on the information received at the input unit, receive a request for activation of the pre-conditioning mode of the battery of the vehicle and select a charging station for charging the battery; based on the information of the battery management system, confirm that a temperature of the battery is less than a predetermined temperature; and operate the battery heater at a predetermined time period before arriving at the selected charging station.

As described above, according to an exemplary embodiment of the present disclosure, a pre-conditioning system for a battery capable of improving charging performance of the battery may be provided.

According to an exemplary embodiment of the present disclosure, the pre-conditioning system for a battery capable of shortening a charging time of the battery may be provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions presented in the exemplary embodiments of the present disclosure are only exemplified for describing the exemplary embodiments according to the concept of the present disclosure, and the exemplary embodiments according to the concept of the present disclosure may be implemented in various forms. Furthermore, present disclosure should not be construed as being limited to the exemplary embodiments described herein and should be understood to include all modifications, equivalents, and substitutes included in the spirit and scope thereof.

Meanwhile, in the present disclosure, terms such as first and/or second may be used to describe various components, but the components are not limited to the terms. The above terms are used only for distinguishing one component from other components, for example, within the scope of not departing from the scope of the rights according to the concept of the present disclosure, a first component may be referred to as a second component, and similarly, the second component may also be referred to as the first component.

When a component is referred to as being "connected to" or "accessed by" another component, it should be understood that another component may be directly connected to or accessed by another component, but other components may exist in between. On the other hand, when a component is referred to as being "directly connected to" or "directly accessed by" another component, it should be understood that no other component is present in the middle. Other expressions for describing the relationship between components, that is, "between" and "immediately between" or "adjacent to" and "directly adjacent to" should be interpreted similarly.

Like reference numerals refer to like components throughout the specification. On the other hand, terms used herein are for describing the exemplary embodiments and are not intended to limit the present disclosure. In the present specification, a singular form also includes plural forms unless otherwise specified in the phrase. As used herein, "comprises" and/or "comprising" means that the stated component, step, operation and/or element does not exclude the presence or addition of one or more other components, steps, operations and/or elements.

As described above, charging performance of a lithium-ion battery currently provided in a vehicle is affected by a temperature to which the battery is exposed. For example, when comparing high-power charging at a room temperature of 25° C. and a low temperature of about −7° C., it has been confirmed that a charging time takes about three times longer at the low temperature.

Accordingly, when the temperature of the battery is increased before charging to shorten the charging time, charging performance may be improved. There are several temperature-raising functions that currently exist in eco-friendly vehicles. The first is a technology that raises the temperature of the battery before charging for securing "driving performance" at low temperatures. This technology is to secure "driving performance" but is not designed to improve the "charging performance" of the battery, so that the temperature-raising function is configured to operate only at extremely low temperatures of about not greater than −10° C. As an exemplary embodiment of the present disclosure, when an air conditioning reservation is set during parking, there is a technology in which the temperature inside the vehicle is raised according to the set departure time. However, the temperature of the battery is unable to be controlled under the present technology.

Accordingly, an objective of the present disclosure is to provide a pre-conditioning system for a battery capable of improving the charging performance of the battery based on information, such as charging infrastructure information, a satellite navigation system (GPS), and the like, received by the vehicle. The charging infrastructure information includes fast charging station information, whether the charger to be used is faulty, whether the charger is in use, information on the waiting list of the charger, and the like. The pre-conditioning system according to an exemplary embodiment of the present disclosure provides the most suitable fast charging station information to the user by use of the charging infrastructure information. Furthermore, the present disclosure may maximize the charging performance by operating the temperature-raising function of the battery before a preset specific time from the expected arrival time of the vehicle in consideration of factors, such as expected arrival time information from vehicle navigation, battery temperature, outside temperature, and the like.

Hereinafter, the present disclosure will be described in detail with reference to the accompanying drawings.

Figure 1:
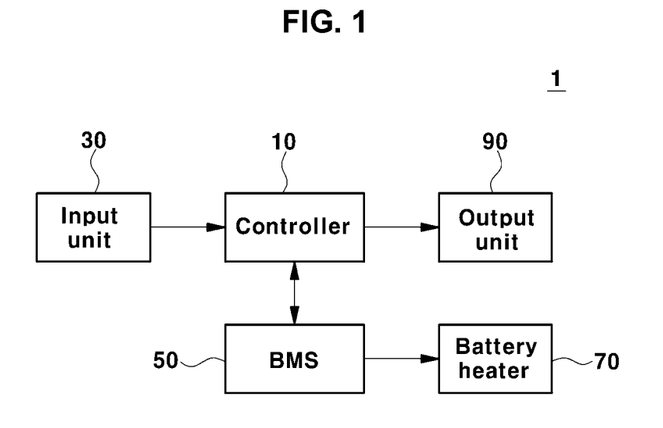
FIG. 1 is a block diagram of a pre-conditioning system for a battery according to an exemplary embodiment of the present disclosure.

As shown in FIG. 1, a pre-conditioning system 1 for a battery according to an exemplary embodiment of the present disclosure includes a controller 10, an input unit 30, a battery management system 50, a battery heater 70, and an output unit 90.

The controller 10 oversees control of the pre-conditioning system 1 for a battery. The controller 10 may be a vehicle controller or may be configured as a separate controller for the present system 1.

The controller 10 receives various information input from the input unit 30. The input unit 30 is configured to receive vehicle location information, traffic information, location-related surrounding information, and the like, and to receive a request from a driver or vehicle user.

The input unit 30 is configured to receive the request from the driver or the user of the vehicle. In an exemplary embodiment of the present disclosure, the input unit 30 is an Audio, Video & Navigation (AVN) system of a vehicle. The driver may request activation of a pre-conditioning mode according to the present system 1 through the input unit 30. Also, information on a destination and/or waypoint of the vehicle may be input through the input unit 30.

The input unit 30 may collect vehicle location information, traffic information, location-related surrounding information, and the like. In an exemplary embodiment of the present disclosure, the information may be obtained based on the AVN system, that is, a GPS-based navigation system provided in the vehicle. In an exemplary embodiment of the present disclosure, the input unit 30 receives charging infrastructure information. As a non-limiting example, the input unit 30 may receive location information of a battery charging station. As one non-limiting example, the input unit 30 may receive information regarding whether the battery charging station is a charging station that provides fast charging or super-fast charging. As another non-limiting example, the input unit 30 may receive information on whether each fast charging station or super-fast charging station normally provides a charging function. That is, it is possible to collect failure information of the charging device of each charging station. As another non-limiting example, the input unit 30 may receive usage information of each charging station. In other words, it collects information related to whether the charging device of each charging station is being used by other vehicles. As another non-limiting example, the input unit 30 may collect wait line information of each charging station. For example, it is possible to collect information related to how many vehicles are waiting to be charged at each charging station, how long it takes for the waiting vehicles to complete charging, and the like. In an exemplary embodiment of the present disclosure, the charging infrastructure information may be accessible through an open source, cloud service, or the like.

The controller 10 is also configured to be communicable with the vehicle's battery management system (BMS) 50. In an exemplary embodiment of the present disclosure, the BMS 50 sends real-time temperature information of the battery to the controller 10. In an exemplary embodiment of the present disclosure, BMS 50 transmits state of charge (SoC) information of the battery to the controller 10. In an exemplary embodiment of the present disclosure, the BMS 50 is configured to transmit operation state information of the battery heater 70 for increasing the temperature of the battery to the controller 10.

The controller 10 receives the information and the like about the battery from the BMS 50. Furthermore, the controller 10 may transmit a request regarding the operation of the battery heater 70 to the BMS 50 as necessary. The controller 10 may transmit an ON or OFF operation command of the battery heater 70 to the BMS 50 based on an environmental condition including user input information, vehicle route information, and charging infrastructure information, and a state condition including battery condition information transmitted from the BMS 50.

Furthermore, the controller 10 is configured to be communicable with the output unit 90. In an exemplary embodiment of the present disclosure, the output unit 90 may output information through the AVN system. In an exemplary embodiment of the present disclosure, the output unit 90 may output information to a cluster of vehicles. In an exemplary embodiment of the present disclosure, the output unit 90 may output information to an application provided in a smart device, such as a smartphone, paired with the vehicle.

The output unit 90 may output status information of the pre-conditioning system 1. In an exemplary embodiment of the present disclosure, the output unit 90 may display request information for activation of pre-conditioning mode of the pre-conditioning system 1 transmitted from the input unit 30 to the controller 10. When there is no request for activation of the pre-conditioning mode, the pre-conditioning system 1 may be controlled not to operate. When a request for activation of the pre-conditioning mode is received through the input unit 30, the output unit 90 may display a state of being activated. In an exemplary embodiment of the present disclosure, the output unit 90 may visually provide an operating state of the pre-conditioning system 1 to note the driver.

Furthermore, the output unit 90 may provide the driver with route information related to the destination and/or waypoint based on the destination and/or waypoint input through the input unit 30.

Hereinafter, an operating method of a pre-conditioning system for a battery according to an exemplary embodiment of the present disclosure will be described with reference to FIG. 2, FIG. 3, FIG. 4 and FIG. 5.

Figure 2:
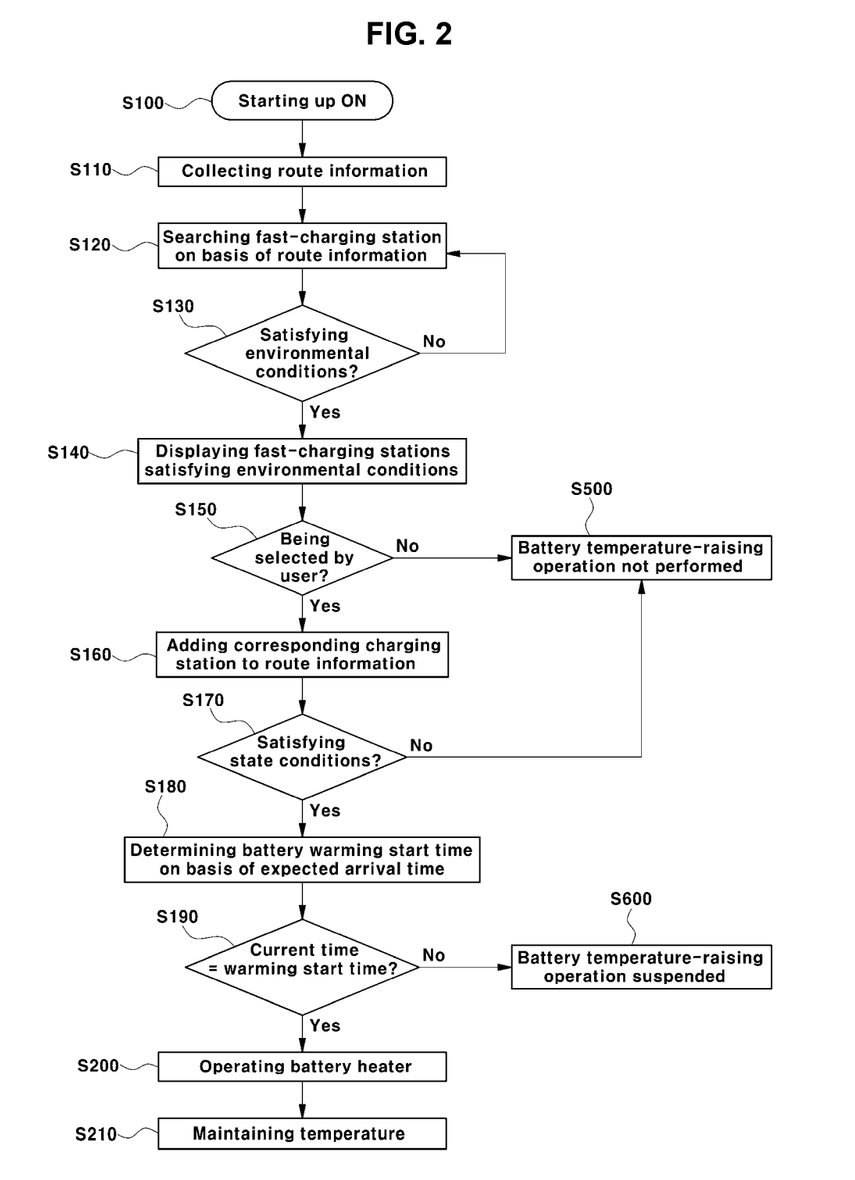
FIG. 2 is a flowchart of an operating method of the pre-conditioning system for a battery according to various exemplary embodiments of the present disclosure.

As shown in FIG. 2, in step S100, the controller 10 receives starting up ON information of the vehicle. The pre-conditioning system 1 according to an exemplary embodiment of the present disclosure may be configured to operate while the vehicle is running.

Destination and/or waypoint information of the vehicle is collected through the input unit 30, and route information to the destination and/or waypoint is obtained based on the received information in S110. The route information to the destination and/or waypoint may be determined by the navigation controller or may be obtained by the controller 10. The obtained path information is displayed on the output unit 90.

The input unit 30 collects information of the battery charging station within a predetermined range from the route to the previously determined destination, and transmits the collected information to the controller 10 in S120. The controller 10 determines whether the environmental conditions are satisfied based on the collected information of the charging stations in S130. Satisfaction of the environmental conditions may be determined to select a charging station optimized in terms of time, convenience, and the like among the identified charging stations.

Figure 3:
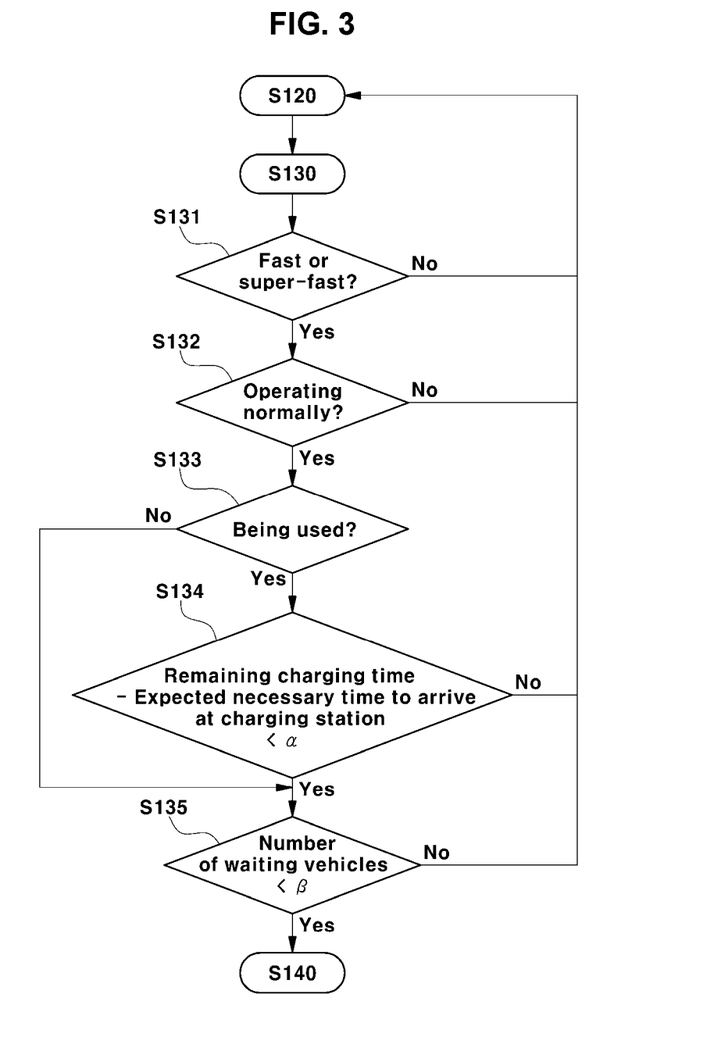
FIG. 3 is a flowchart for determining whether environmental conditions are provided according to an exemplary embodiment of the present disclosure.

As in the flowchart of FIG. 3, it may be determined whether the environmental conditions are satisfied. The controller 10 determines whether each searched charging station provides fast or super-fast charging in S131. Furthermore, when each charging station provides fast or super-fast charging, the controller 10 checks whether the charger of each charging station is operating normally in S132. Furthermore, when it is confirmed that the charger of each charging station is operating normally, the controller 10 determines usage information of the corresponding charging station in S133. That is, whether another vehicle is being charged through the charger is checked. This is to minimize the waiting time so that quick charging is possible. When the charger of the charging station is in use, the controller 10 predicts the time that will take to charge at the corresponding charging station in S134. As a non-limiting example, the controller 10 determines a difference between the remaining charging time required for another vehicle being charged to complete charging and the expected necessary time required to arrive at the corresponding charging station based on the vehicle's route information. When the difference is smaller than a preset time value α, it is predicted that charging at the corresponding charging station is sufficiently rapidly accomplished. For example, a may be a preset value such as 5 minutes or 10 minutes. When the difference is greater than a, charging at the corresponding charging station is deemed undesirable, and another charging station that will provide faster charging may be searched for. Furthermore, when the difference is smaller than a, the controller 10 checks information on the number of vehicles waiting for charging at the corresponding charging station in S135. When the number of waiting vehicles is smaller than a preset value β, the corresponding charging station is also determined as a suitable charging station where charging is possible. When the number of waiting vehicles is greater than B, the corresponding charging station may be excluded from the selection. As a non-limiting example, β may mean that the number of waiting vehicles is one, two, and the like. On the other hand, as for the number of waiting vehicles, wait line according to reservation information for the corresponding charger collected by the input unit 30 may be utilized.

Figure 4:
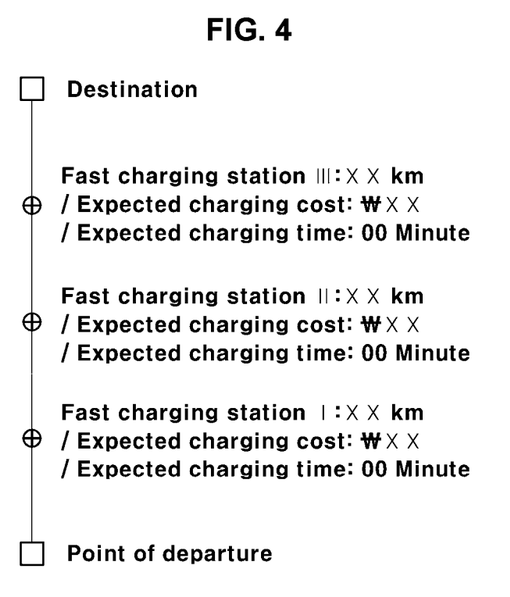
FIG. 4 is a view showing an exemplary display window of an output unit of the present disclosure.

With reference back to FIG. 2, when the environmental conditions are satisfied, the controller 10 outputs the selected fast charging stations that satisfy the environmental conditions through the output unit 90 in S140. For example, charging station information satisfying the environmental conditions may be displayed on the path information displayed on the output unit 90. As shown in FIG. 4, information on the fast charging stations that satisfy the environmental conditions and a remaining distance to each of the fast charging stations, an expected charging cost and expected charging time at each of the corresponding fast charging stations may be displayed on the route information from a point of departure to the destination.

Furthermore, the driver may select a desired charging station through touch or key manipulation of the output unit 90 in S150. When the desired charging station is selected by the driver, a pop-up window asking whether to add the selected charging station to the current route may be displayed. When the desired charging station is selected, the controller 10 adds the location information of the corresponding charging station to the current route information in S160.

Furthermore, the controller 10 determines whether the state condition for performing the function of the pre-conditioning system 1 is satisfied in S170. The state condition may be determined based on state information of the battery. Furthermore, the state condition may be determined based on user input information of the input unit 30 (for example, an activation request of the pre-conditioning mode) and battery state information from the BMS 50.

Figure 5:
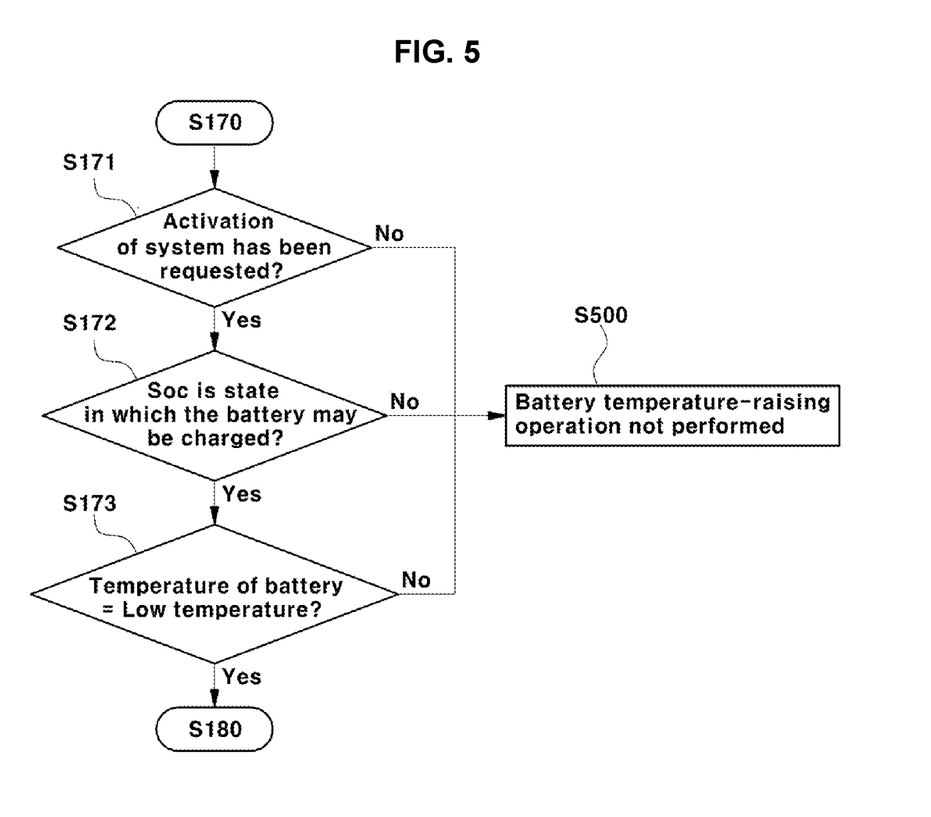
FIG. 5 is a flowchart for determining whether state conditions are provided according to an exemplary embodiment of the present disclosure.

With reference to FIG. 5, the controller 10 determines whether activation of the pre-conditioning mode has been requested through the input unit 30 in S171. Then it is determined whether the state of charge (SOC) value of the battery is a state in which the battery may be charged in S172. Furthermore, the controller 10 determines whether the temperature of the battery is low in temperature S173. Here, a reference value of the low temperature may be preset. In an exemplary embodiment of the present disclosure, the order of steps S172 and S173 may be reversed. When all of the state conditions of steps S171 to S173 are satisfied, the process proceeds to step S180, and an operation for increasing the temperature of the battery is prepared. When the state condition is not provided, the battery temperature-raising operation is not performed in S500.

When the state condition is satisfied, the controller 10 is configured to perform a battery warming operation. The controller 10 determines an expected arrival time to arrive at the selected charging station and determines a battery warming start time based on this in S180.

Furthermore, the controller 10 monitors whether the current time has reached the determined warming start time in S190. When the current time has not reached the warming start time, the battery temperature-raising operation is on standby in S600. When it is determined that the current time has reached the warming start point, the controller 10 performs an operation for increasing the temperature of the battery. The controller 10 instructs the BMS 50 to operate the battery heater 70 and may display on the output unit 90 that the battery temperature-raising operation is in progress in S200. The controller 10 continuously receives the temperature information of the battery from the BMS 50 while the battery heater 70 is operating. When the temperature of the battery reaches a temperature-raising target temperature, the controller 10 is configured to control the battery heater 70 by repeating the ON/OFF operation so that the temperature is maintained until reaching the charging station in S210.

According to an exemplary embodiment of the present disclosure, even in a low-temperature environment, it is possible to maximize the charging performance of the vehicle through the battery conditioning function. The system and method according to an exemplary embodiment of the present disclosure can provide far superior charging performance to vehicles arrived at charging stations compared to a case where the present system and the method is not applied.

According to an exemplary embodiment of the present disclosure, charging infrastructure information, such as charging station failure information, charging station usage information, charging station wait line information, and the like, information, is maximally utilized. Such information is provided to the driver, and the battery temperature-raising function operates in connection with the information. Accordingly, not only can charging capability be secured, but also the product value of a vehicle, specifically defined by waiting time for fast charging or convenience, may be maximized.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of operating a pre-conditioning system for a battery of a vehicle, the method comprising:
   receiving, by a controller, an input of a destination of the vehicle;
   generating and outputting, by the controller, a destination route to the destination;
   searching for, by the controller, information on one or more battery charging stations located within a predetermined range on or around the destination route;
   determining, by the controller, whether each of the searched battery charging stations satisfies a preset environmental condition;
   adding, by the controller, to the destination route a charging station path, wherein the charging station path is a path to a battery charging station selected from the battery charging stations satisfying the preset environmental condition;
   determining, by the controller, whether the battery of the vehicle satisfies a preset state condition; and
   warming, by the controller, the battery before the vehicle arrives at the selected battery charging station based on the preset state condition being satisfied,
   wherein the information on the one or more battery charging stations includes charging infrastructure information, and wherein the charging infrastructure information includes whether each charger at each of the one or more battery charging stations is in use and a number of reservations made for use of each charger at each of the one or more battery charging stations, and
   wherein, for each charger in use, the preset environmental condition is that a difference between a remaining charging time of each charger in use and a time estimate until the vehicle arrives at the searched battery charging station is smaller than a predetermined time and the number of reservations is smaller than a preset number.

2. The method of claim 1,
   wherein the charging infrastructure information further includes whether each of the one or more battery charging stations provides fast or super-fast charging, and whether each charger at each of the one or more battery charging stations is operating normally.

3. The method of claim 2, wherein the preset environmental condition includes that the searched battery charging station provides the fast or super-fast charging.

4. The method of claim 2, wherein the preset environmental condition includes that each battery charger of the searched battery charging station operates normally.

5. The method of claim 1, wherein the pre-conditioning system includes a charging pre-conditioning mode for the battery, and based on the charging pre-conditioning mode being activated, the battery is warmed.

6. The method of claim 5, wherein the preset state condition includes that the charging pre-conditioning mode of the battery has been activated.

7. The method of claim 6, wherein the preset state condition is that a temperature of the battery is less than a preset temperature.

8. The method of claim 6, wherein the preset state condition is that a state of charge (SOC) value of the battery is above a present value.

9. The method of claim 1, wherein the warming of the battery is started based on an expected arrival time at which the vehicle is expected to arrive at the selected battery charging station from a current location of the vehicle.

10. The method of claim 1, wherein the battery warmed by a battery heater of the vehicle.

11. The method of claim 10, wherein, based on a temperature of the battery reaching a preset target temperature by the battery heater, the preset target temperature is maintained by selectively turning on or off the battery heater.

12. The method of claim 1, wherein, based on the vehicle being turned on, the pre-conditioning system is operated.

13. The method of claim 1, wherein the destination includes a waypoint routed through on a way to the destination.

14. The method of claim 1, wherein the adding a charging station path to the destination route includes displaying one or more battery charging stations satisfying the preset environmental condition on the output destination route.

* * * * *